United States Patent [19]

Crillesen

[11] 4,359,294
[45] Nov. 16, 1982

[54] ASSEMBLING PLUG
[75] Inventor: Jan O. Crillesen, Graested, Denmark
[73] Assignee: Ole Leth, Aarhus, Denmark
[21] Appl. No.: 210,567
[22] Filed: Nov. 26, 1980
[30] Foreign Application Priority Data
Nov. 27, 1979 [DK] Denmark ............................. 5037/79
[51] Int. Cl.³ ................................................ B25G 3/00
[52] U.S. Cl. .................................. 403/406; 403/231;
403/381
[58] Field of Search ............... 403/231, 381, 169–172,
403/217, 218, 405, 406, 408

[56] References Cited
U.S. PATENT DOCUMENTS

| 1,067,910 | 7/1913 | Florey | 403/381 |
| 3,399,914 | 9/1968 | Grant | 403/171 X |
| 3,469,865 | 9/1969 | Ellenburg | 403/381 X |
| 3,648,393 | 3/1972 | Parilla | 403/381 X |
| 3,747,885 | 7/1973 | Ciancimino | 403/231 X |
| 3,835,354 | 9/1974 | Pena | 403/171 X |
| 4,025,215 | 5/1977 | Murdock et al. | 403/381 |
| 4,125,338 | 11/1978 | Lew | 403/381 X |

FOREIGN PATENT DOCUMENTS

| 2757163 | 7/1979 | Fed. Rep. of Germany | 403/408 |
| 2064699 | 6/1981 | United Kingdom | 403/406 |

Primary Examiner—Wayne L. Shedd
Attorney, Agent, or Firm—Bec Ker & Becker, Inc.

[57] ABSTRACT

Figure 1:
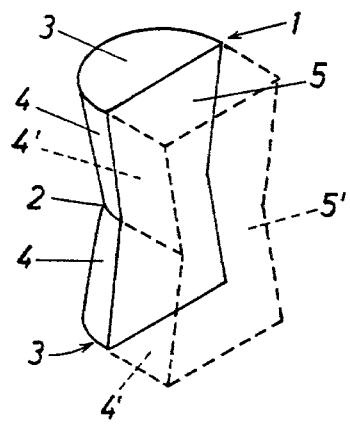

To secure an assembling of two boards against displacement in one direction the assembling plug is worked out as a body (1) having a cross section increasing from a central portion (2) to both sides. The body (1) is placed in corresponding recesses in the two boards so that the central portion (2) is co-extensive with the tangent surfaces of the two boards. The body may have conical faces (4) with planes (4') tangent to these. FIG. 1.

6 Claims, 3 Drawing Figures

ASSEMBLING PLUG

BACKGROUND OF THE INVENTION

1. Field of the invention

The invention relates to an assembling plug for sectional furniture, shelves and the like, where the end of one board is assembled with the edge of another board.

2. Prior art

Such an assembling is normally carried out by dovetailing or by means of tenons or dowels. The disadvantage of these known assemblings are, however, that they are uncapable of standing up to pulls in the longitudinal direction of one of the two boards.

SUMMARY OF THE INVENTION

It is the object of the present invention to provide an assembling plug eliminating this disadvantage.

This object is obtained by means of the assembling plug of the invention which plug is characterized therein that it consists of a body increasing in cross section from a central portion to both sides and having a plane running parallel with its longitudinal axis.

Such a body can be inserted in corresponding milled grooves in the edges of the two boards so that the plane is flush with one board and the edge portion of the other board.

Preferably, the body is worked out with conical side faces extending from the central portion. Thereby, it is obtained that an ordinary truncated cone-shaped cutting machine can be used for the milling of the boards.

Furthermore, in order to obtain a greater strength the body may have plane side faces tangent to the conical side faces.

To secure the body in the milled grooves of the boards the side faces of the body can be channelled or provided with knobs projecting from the side faces.

In a specific embodiment of the invention, the body is divided through the longitudinal symmetry plane. Thereby, a wedge-shaped part can be placed between the two halves so that the body is further fastened in the milled grooves.

Figure 2:
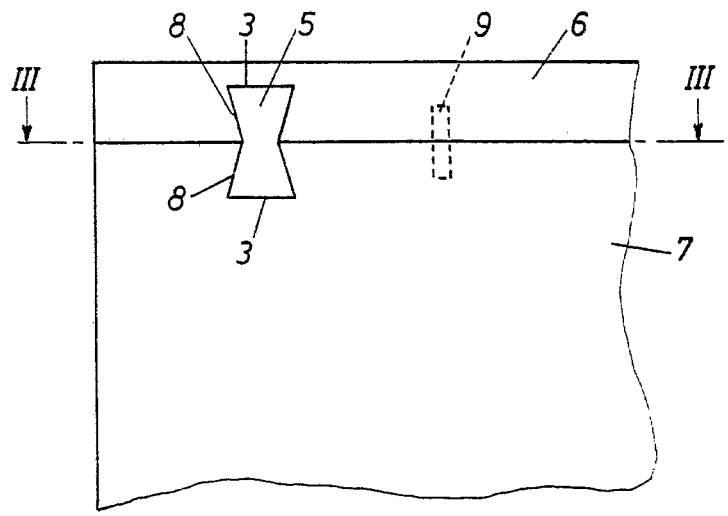
Figure 3:
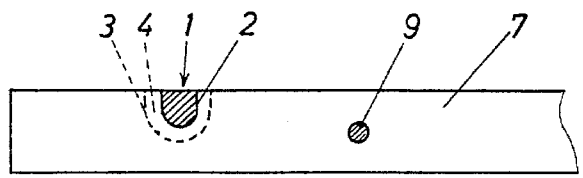

The invention is further illustrated in the following with reference to the drawings, wherein FIG. 1 is an assembling plug of the invention, FIG. 2 is the assembling plug, placed between two boards, and FIG. 3 is a section along the line III—III of FIG. 2.

The assembling plug of FIG. 1 consists of a body 1, which may be made from wood, plastics or another suitable material. The body 1 has an increasing cross section from a central portion 2 to both sides to plane-parallel end faces 3. Preferably, the body has truncated cone-shaped side faces 4 and a plane 5.

As shown by means of dotted lines, the body 1 may be extended with plane side faces 4' tangent to the truncated cone-shaped faces 4. In this case, the end of the body 1 is also a plane 5'. The dimension of the body 1 perpendicular to the face 5' is dependent on the thickness of the boards in question and the intended strength of the connection.

FIGS. 2 and 3 show a portion of a connection between two boards 6 and 7 using the assembling plug of the invention. In advance, milled grooves 8 corresponding to the body 1 have been made in the boards 6 and 7 which can be done by means of a rotating conical cutting iron. Upon assembling of the boards 6 and 7, e.g. by means of dowels 9, the body 1 is inserted in the milled grooves 8 and secured either by means of glue or by interference fitting. In the latter case, the conical faces 4 and possibly the planes 4' may be channelled or provided with small knobs projecting from the faces.

As will be apparent from FIG. 2 and 3, an assembling with dowels only would not be secured against tractive forces upwards in the board 6 of FIG. 2, but with the assembling plug 1 placed as shown, this disadvantage will be eliminated.

What I claim is:

1. An assembly plug for sectional furniture, shelves and the like, wherein the end of one board is assembled with the edge of another board, said plug comprising a body with a central portion, two end faces, and a longitudinal axis extending from one end face to the other, the cross sectional area of said body, taken perpendicular to said longitudinal axis, increasing from said central portion toward said end faces, said body also being provided with a planar surface extending parallel to said longitudinal axis and from one end face to the other.

2. The assembling plug of claim 1, in which said body is provided with conical side faces extending from said central portion to said end faces.

3. The assembling plug of claim 2, in which said body is provided with additional side faces as inclined planes which are tangent to said conical faces and extend from said central portion to said end faces, and between said conical faces and said planar surface.

4. The assembling plug of claim 2 or 3, in which at least one of said conical and inclined-plane side faces are channelled.

5. The assembling plug of claim 3, in which said body comprises two symmetrical portions, the plane of symmetry passing through said longitudinal axis.

6. The assembling plug of claim 2 or 3, in which at least one of said conical and inclined-plane side surfaces are provided with knobs projecting from said side faces.

* * * * *